Dec. 3, 1968    A. L. FACCOU ET AL    3,414,276
PACKING FOR FLUID JOINT
Filed June 30, 1964
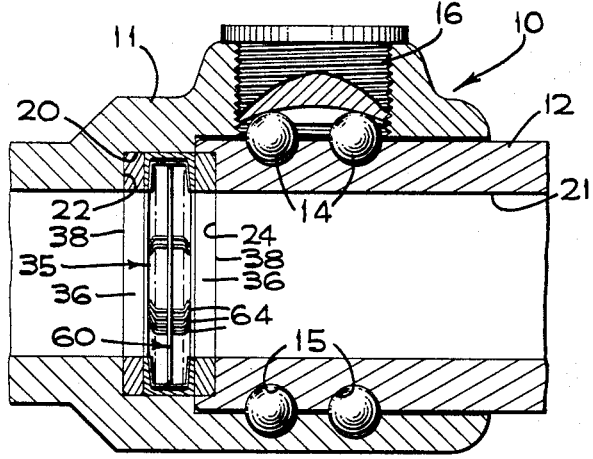
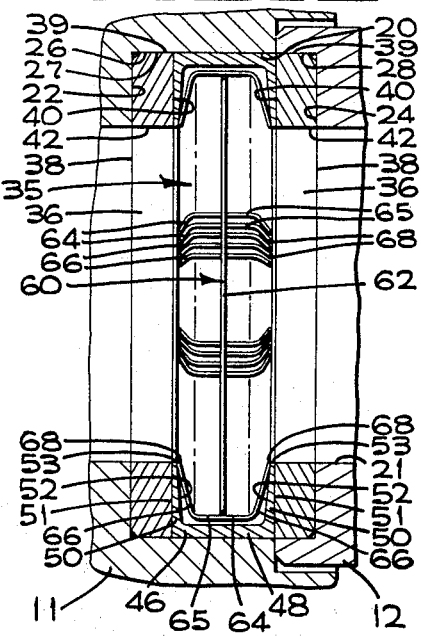
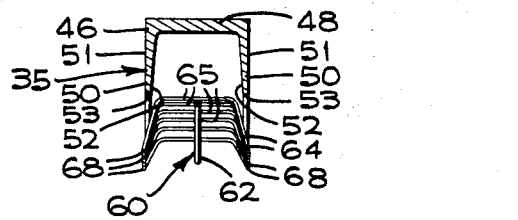
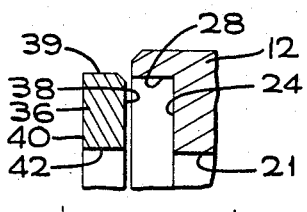
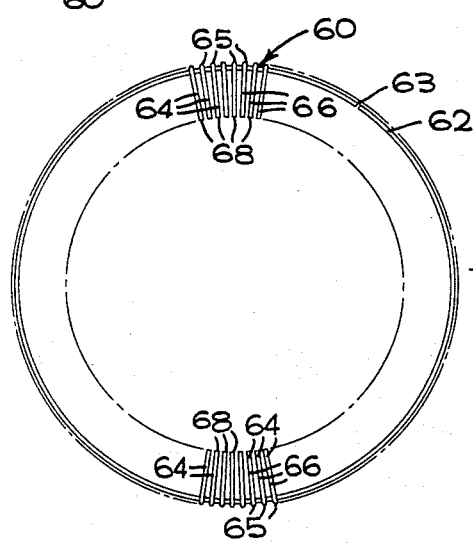
INVENTORS
ARMAND L. FACCOU
LANDIS H. PERRY
BY *Hans F. Hoffmeister*
ATTORNEY

United States Patent Office 3,414,276
Patented Dec. 3, 1968

3,414,276
PACKING FOR FLUID JOINT
Armand L. Faccou, Santa Ana, and Landis H. Perry, Newport Beach, Calif., assignors to FMC Corporation, San Jose, Calif., a corporation of Delaware
Filed June 30, 1964, Ser. No. 379,222
6 Claims. (Cl. 277—95)

The present invention pertains to a packing for a fluid joint and more particularly to a packing which is capable of maintaining a fluid-tight seal in a swivel pipe joint even though the joint is conducting fluids under very high temperature and pressure.

Swivel joints are frequently used in systems which carry fluid under high temperature and pressure. For such swivel joints to be an effective part of the system, they must use packings that are capable of maintaining an effective seal under high temperature and pressure. Such sealing problems have been solved for handling of fluids up to a temperature of about 450° F. with a packing which includes an inert plastic seal, spring-urged against a rotating face of the swivel joint. However, such plastic seals lose their sealing effectiveness at temperatures of 500° F. and above.

Accordingly, the packing of the present invention avoids the use of plastic and, instead, uses metal. Although metal-to-metal seals have been known in the past, they have not been satisfactory for dynamic sealing purposes at high temperatures where lubrication is lacking. That is, the high temperatures may evaporate any applied lubricant or the hot gas or liquid may not have any lubricating properties insofar as the metals are concerned. Lacking lubrication, therefore, dynamic metal-to-metal seals have failed because of galling or seizing at the interface.

In order to obviate the need for an applied lubricant, the present invention employs a metal-carbon packing, the carbon being self-lubricating and thus requiring no applied lubricant. Although metal-carbon packings have been known, certain prior packings using these materials have not been fully satisfactory because the metal-carbon interface has not remained fluid-tight under high pressure, high temperature, dynamic conditions.

It is an object of the present invention to provide an improved packing for a fluid joint.

Another object is to provide a packing for a swivel joint which maintains a fluid-tight seal even when exposed to fluids under high temperature and pressure.

Another object is to provide a packing for a swivel joint that does not use plastic or other material which loses its sealing effectiveness when exposed to fluids having a deteriorating effect on plastics.

Another object is to provide a packing having a metal seal which does not gall or seize when operating under high temperatures.

Another object is to provide a packing having a dynamic seal which is self-lubricating even under high temperatures and pressures.

Another object is to provide an improved spring energizer for a packing.

These, together with other objects, will become apparent with reference to the following description and accompanying drawing, in which:

FIGURE 1 is a longitudinal diametric section of a swivel pipe joint and of a packing embodying the present invention fitted in the joint.

FIGURE 2 is an enlargement of a portion of FIGURE 1 showing the subject packing in more detail.

FIGURE 3 is a fragmentary cross-section of a U-shaped seal and spring energizer of the subject packing with the energizer being shown in a position just before it is placed inside the seal.

FIGURE 4 is a fragmentary section of part of a conduit and of a carbon ring, which is included in the subject packing, showing the ring and conduit disassembled.

FIGURE 5 is a fragmentary face view of the spring energizer of the subject packing showing only a few of the spring fingers with the phantom lines indicating continuation of the fingers about the entire mounting rib.

Referring more particularly to the drawing, a swivel pipe joint is indicated by the numeral 10 in FIGURE 1 and includes a female conduit 11 and a male conduit 12 rotatably mounted within the female conduit by balls 14 which are held in their respective races 15 by a plug 16. For the purposes of the present invention, it is preferred that the conduits are of a ferrous metal such as cast iron or steel.

The swivel joint 10 provides an annular chamber 20 circumscribing a flow passage 21 through the joint. The chamber is defined by a first radial wall 22, forming a part of the female conduit 11; a second radial wall 24, forming a part of the male conduit 12 and in confronting relation to the first radial wall; and a cylindrical wall 26 extending between the radial walls. The cylindrical wall has a first portion 27 constituting a part of the female conduit and a second portion 28 forming a part of the male conduit.

A packing 35 embodying the present invention includes sealing rings 36 of impervious, corrosion-resistant, self-lubricating material, such as carbon-graphite, positioned in the chamber 20. Each sealing ring has a radial back face 38 against its corresponding radial wall 22 or 24, a cylindrical outer surface 39 against its respective portion 27 or 28 of the cylindrical wall 26, a radial front face 40, and an inner surface 42 having the same diameter as the inside diameter of each conduit 11 or 12.

Because of the modulus of elasticity of carbon, it is necessary to shrink, rather than to press, the rings 36 into the chamber 20 so that the rings will maintain a fluid-tight seal with their respective conduits 11 and 12 at the elevated working temperature to which the present packing 10 is subjected. Therefore, as illustrated in FIGURE 4, the outside diameter of each ring is greater than the inside diameter of the chamber, or stated otherwise, the diameter of the outer cylindrical surface 39 of each ring is greater than the diameter of the cylindrical wall 28 before the ring is positioned within the chamber. Each ring is diametrically constricted by shrinking, thence fitted into the chamber, and thereafter allowed to expand whereby the cylindrical wall maintains the ring under circumferential compression. Furthermore, because of the relatively low coefficient of expansion of carbon, the outside diameter of the rings and the inside diameter of the chamber must be such that there is a residual interference between the cylindrical wall and the rings at the maximum working temperature of the packing. In this manner, the rings will appear to have the same coefficient of expansion as the metal conduits up to the temperature where the inside diameter of the chamber becomes greater than the outside diameter of the rings, a temperature which is not reached in the normal use of the subject swivel joints. For temperatures in the range of 500° F. to 900° F., the conduits 11 and 12 should be made of cast iron or steel, as above suggested, since this material has a relatively low coefficient of expansion as compared, for example, with aluminum. It is also to be observed that since the rings are maintained under compression throughout the working range of temperatures, they are able to withstand the high pressures utilized. In other words, the rings are never in tension, for if they were, they would soon crack because of the low modulus of elasticity carbon.

The packing 35 of the present invention also includes an annular metallic seal 46 having a U-shaped cross section and preferably being of stainless steel. The seal has a cylindrical intermediate wall 48, the outside diameter of which is slightly less than the maximum diameter of the chamber 20. The seal is positioned within the chamber with the intermediate wall engaging the first portion 27 of the cylindrical wall 26, it being noted that the lengthwise dimension, measured in a direction parallel to the axis of the flow passage 21, is approximately equal to the minimum spacing between the front faces 40 of the sealing rings 36. The annular seal also has a pair of side walls 50 integral with the intermediate wall and projecting therefrom in confronting relation to each other. The side walls have substantially parallel sealing surfaces 51 respectively engaging the front faces 40 of the rings 36. The side walls also have bearing surfaces 52 which are tapered from the intermediate wall to circular edges 53 of the side walls; these edges have diameters approximately the same as the inside diameters of the rings and conduits 11 and 12. The side walls of the seal have limited resilient flexibility with respect to the intermediate wall so that they can be urged into fluid-tight engagement with their respective sealing rings 36.

In order to maintain the seal 46 in fluid-tight engagement with the rings 36, a spring energizer 60 is included in the subject packing 35. This energizer is provided with a relatively rigid split circular mounting rib 62 of round wire (for example Inconel "X" or stainless steel wire). The rib has a gap therein at 63 so that the energizer can be diametrically constricted for insertion in the seal 46. The outside diameter of the rib and the inside diameter of the intermediate wall 48 of the seal are such that the rib is circumferentially spaced from the intermediate wall when the former is positioned within the latter. The energizer also includes a plurality of U-shaped spring fingers 64 of round wire, similar to the wire for the rib. Each finger has an intermediate portion 65 welded, or otherwise secured, to the mounting rib and projecting equidistantly in opposite directions therefrom. Each finger also has side portions 66 integral with the intermediate portion and projecting in obtuse angular relation therewith. The two side portions of each finger are in confronting divergent relation with each other and are resiliently flexibly movable toward and away from each other. Furthermore, the side portions of the fingers terminate in ends 68, with the ends of all of the side portions on each side of the rib being in a substantially circular formation, as illustrated in FIGURE 5. Adjacent side portions of adjacent fingers, on each side of the rib, converge from their respective intermediate portions toward their respective ends so that adjacent ends of adjacent side portions are contiguous. Furthermore, the maximum spacing between the two ends 68 of each finger is greater than the maximum spacing between the bearing surfaces 52 of the seal 46.

Although for illustrative convenience only a few spring fingers 64 are shown in FIGS. 1, 2 and 5, it is to be understood that these fingers are equidistantly spaced about the entire circumference of the rib, as the phantom lines indicate.

Before the metallic seal 46 is positioned within the chamber 20, the energizer 60 is positioned within the seal. Thus, the energizer is diametrically constricted and fitted within the seal so that the intermediate portions 65 of the spring fingers 64 are closely adjacent to the intermediate wall 48 of the seal, so that the side portions 66 of the fingers project alongside of the side walls 50, and so that the ends 68 of the fingers bear outwardly against the side walls immediately adjacent to the edges 53. In fact, the ends of the fingers contact the bearing surfaces substantially only immediately adjacent to the edges 53 at a plurality of contiguous independent pressure points extending about the circumference of the seal, a feature of considerable importance to the fluid-tight integrity of the sealing interface between the rings 36 and the seal. It is of course, understood, that by inserting the energizer in the seal, the side portions of the spring fingers are resiliently urged toward each other, placing these fingers under stress whereby they bear outwardly against the side walls of the seal and urge the latter into fluid-tight engagement with their respective carbon rings 36.

For the most efficient sealing, it is important to concentrate the pressure along the edges 53. With the present packing 35, the sealing pressure is concentrated on a circular line immediately adjacent to the edges 53. Furthermore, and of considerable importance, the side portions 66 of the spring fingers 64 are capable of flexing independently of each other and are thus able to accommodate themselves to irregularities in the sealing interface between the front faces 40 of the rings 36 and the sealing surfaces 51 of the side walls 50, while still maintaining a fluid-tight seal.

When using the swivel pipe joint 10 incorporating the subject packing 35, fluid is conducted through the conduits 11 and 12 and, of course, flows into contact with the packing 35. As this fluid is being conducted, the conduits are rotating relatively to each other whereupon the front face 40 of the carbon ring 36 connected to the male conduit 12 slides over the sealing surface 51 of the adjacent side wall 50 of the seal 46, thereby constituting a dynamic seal. Even though the conducted fluid is in a temperature region from about 500° F. to about 900° F. and is under high pressure, and even though the packing is without any lubricating agent, the fluid-tight integrity of the dynamic seal is maintained. As is now believed to be understood, the metallic side wall rubbing against the carbon ring provides an effective seal without galling or seizing at the interface. The carbon ring is impervious to fluid, and the spring energizer 60 resiliently maintains the side wall against the ring in a fluid-tight relation. Even though the metal of the conduits 11 and 12 expands, causing an increase in the diameter of the chamber 20, the carbon rings are still maintained under circumferential compression so that a fluid-tight seal is maintained between the rings and the chamber walls 22, 24 and 26. Furthermore, wear of the front faces 40 of the rings and temperature changes are compensated for by the flexibility of the side walls 50 of the spring fingers 64 and by the resilience of the rib 62 which is held in diametric compression in the seal.

One of the most important features of the present invention is the spring energizer 60. Since the subject packing uses non-elastomeric sealing members which are incapable of self-accommodation to irregularities in the sealing interface, it is very important for the energizer to exert high unit loading approaching as nearly as possible the unit loading obtained with an elastomer. The individual wire fingers that are in the described contiguous circular formation provide a spring loading which closely approximates the loading obtained with an elastomer.

From the foregoing, it will be evident that an improved packing for a fluid joint has been illustrated and described. Although, the packing is effective at normal temperature pressures, it is particularly useful under high temperature and pressure; for example, it has been successfully used to conduct steam at 700° F. and 300 p.s.i. without galling or leaking.

Although a preferred embodiment of the present invention has been shown and described, it will be understood that various changes and modifications may be made in the details thereof without departing from the spirit and the scope of the appended claims.

Having described the invention, what is claimed to be new and desired to be secured by Letters Patent is:

1. In a joint including a wall extending about and disposed transversely of a flow passage through the joint, a carbon ring extending about the passage and positioned against said wall, an annular metallic seal positioned against the ring, and means applying pressure at a pluality of independent pressure points against said seal urging said seal into fluid-tight engagement against said ring, said pressure points being located on a line which extends about said passage.

2. In the joint of claim 1 wherein said joint includes a chamber around and opening into said passage, said chamber being partially defined by said wall, said seal and ring being relatively rotatable, said seal including means mounting it in the chamber and resiliently urging it against said wall, and said urging means allowing said seal to flex along segments thereof at said plurality of independent pressure points and independently of the remainder of the seal in order to accommodate irregularities in the interface between the seal and the ring without breaking said fluid-tight engagement between said seal and ring.

3. In the joint of claim 1 wherein adjacent pressure points are substantially contiguous.

4. In a swivel joint including an annular chamber circumscribing a flow passage through the joint, said chamber being defined by a pair of confronting radial walls and a cylindrical wall extending between the radial walls, one of said radial walls being rotatable relative to the other radial wall, carbon graphite rings fitted in the chamber having radial back faces individually engaging said radial walls, cylindrical surfaces engaging the cylindrical surface of the chamber and confronting radial front faces, an annular metallic seal of the U-shaped cross-section positioned in said chamber having an intermediate wall engaging the cylindrical surface of the chamber and side walls projecting from the intermediate wall and engaging the front faces of the rings, and an energizer including an annular mounting member positioned within the cylindrical wall and a plurality of U-shaped spring fingers secured to the mounting member and resiliently bearing against the side walls of the seal and pressing said side walls into fluid-tight engagement with their respective rings, said rings being rotatable with their respective radial walls so that a dynamic seal exists between at least one of said rings and its engaging side wall.

5. In the swivel joint of claim 4 wherein said rings are maintained under diametric compression by engagement of their respective cylindrical surfaces with the cylindrical surface of the chamber so that under temperatures within the range of 700° F. to 900° F. a fluid-tight seal exists between said cylindrical surfaces of the ring and the chamber, and wherein said walls of the chamber are of ferrous metal.

6. A packing especially adapted for sealing fluids at elevated temperatures and pressures, comprising an annular metallic seal of generally U-shaped cross-section including a generally cylindrical intermediate wall and a pair of confronting side walls projecting from the intermediate wall and terminating in peripheral edges which define the inner diameter of the seal, an energizer for the seal including a slender circular central rib generally round in cross-section and extending about the interior of the intermediate wall, and a plurality of slender resilient generally U-shaped fingers generally round in cross-section secured to the rib in circumferentially spaced relation therearound and projecting from the rib radially inwardly toward said side walls of the seal for resiliently urging said side walls apart, the engagement of said fingers with said side walls being confined to the engagement of the ends of said fingers with said side walls closely adjacent said peripheral edges thereof, each end of each finger being spaced from the ends of adjacent such fingers when said energizer is relaxed but being substantially contiguous to the adjacent ends of the adjacent fingers when said energizer is installed, thereby providing a substantially continuous circular line of pressure against each side wall.

References Cited

UNITED STATES PATENTS

| | | | |
|---|---|---|---|
| 2,521,692 | 9/1950 | Costello | 277—236 X |
| 2,969,998 | 1/1961 | Rodaway | 277—236 X |
| 2,243,227 | 5/1941 | Stratton | 277—81 X |
| 2,366,161 | 1/1945 | Tweedale | 277—235 X |
| 2,512,883 | 6/1950 | Warren | 277—206 X |
| 2,789,847 | 4/1957 | Jackson | 277—84 |
| 3,142,498 | 7/1964 | Press | 285—12 |

FOREIGN PATENTS 2,395 11/1964 Great Britain.

LAVERNE D. GEIGER, *Primary Examiner.*

J. S. MEDNICK, *Assistant Examiner.*